Feb. 2, 1932.  T. HANSEN  1,843,639
HOSE FILTER
Filed March 17, 1930
Fig.1
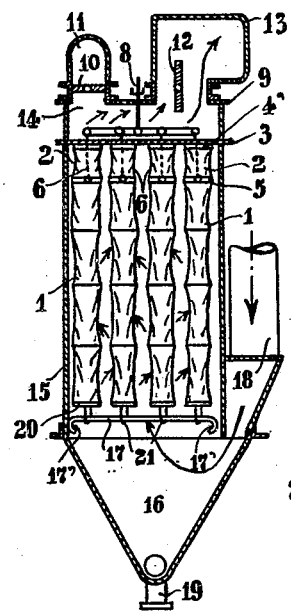
Fig.2
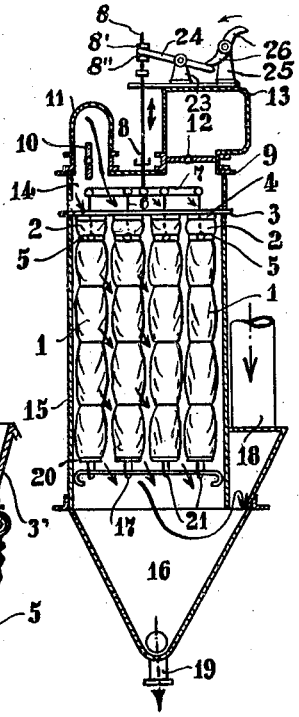
Fig.3
Fig.4
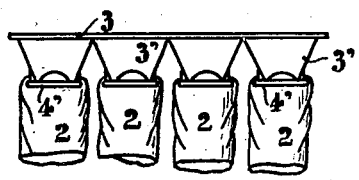
Fig.6
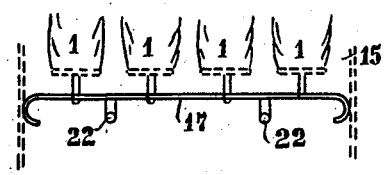
Fig.5
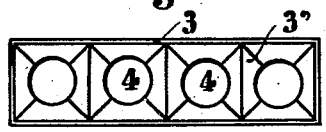
Fig.7
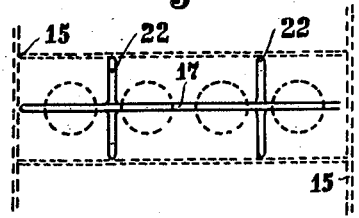
Inventor:
Theodor Hansen
by  Attorney Patented Feb. 2, 1932

1,843,639

UNITED STATES PATENT OFFICE

THEODOR HANSEN, OF WUPPERTAL-BARMEN, GERMANY

HOSE FILTER

Application filed March 17, 1930, Serial No. 436,266, and in Germany December 21, 1928.

In hose filters of known type and with automatic cleaning, the separate hoses have generally their lower ends attached to a common bottom plate in which are provided openings registering with those of the hoses and through which the gases to be purified enter the said hoses. The upper extremities of these hoses are, on the contrary, closed and in suspended position upon a horizontally arranged support which, on the one hand, is designed for transmitting shaking movement to the hoses when these are to be purified, but which, on the other hand, must be adjusted from time to time in order to adapt it to the unavoidable variations of length of said hoses. In fact, according to the nature of the gases to be purified, the hoses get longer or shorter so that an adjustment of the support in the vertical plane has to take place in either direction, as the case may be.

It is quite natural that the said adjustment may be easily overlooked, and owing particularly to inattention, it is. Therefore, should the hoses get shorter, the connecting ropes will tear off, but should the hoses get longer, they will rub against one another or against the walls and thus get quickly worn. Hoses made of very woofy, unelastic material, are subject to the formation of flexures, and these repeatedly formed flexures cause destruction of the material. In filter devices provided with a hose bottom, the dust laden air has to pass through narrow openings of the hose connecting pipes, that is to say, it has to pass through a relatively small cross-section with high velocity before coming in contact with the hoses; in consequence, the lower portion of each filter hose is exposed to a higher stress than the whole circumference thereof. A further disadvantage is that in case of slackening of the hoses, the latter will cause obstruction of the entrance openings and thus oppose undesirable resistance to the entrance of dust laden air. Finally, the high entrance velocity often causes the dust laden air to be entrained through the hoses.

The present invention avoids all the objections above mentioned by the hoses being with their upper ends arranged in suspended position upon a plate provided with openings in communication with said hoses, and above which plate there are secured, on the one hand, connections for the outgoing air and for the rinsing air respectively, and on the other hand the shaking device proper, whereas the lower hose ends are closed and hang free so that each hose even in case of variations of length, will yet hang smooth and without folds being formed, thereby avoiding inadmissible tensions or detrimental stress. In addition to this, any importunate stretching of the hoses is dispensed with owing to the regulation of the required hose length being made automatically. A more specific advantage resides still in the possibility to use without any detriment relatively rigid hoses made of heat-resisting material, such as asbestos weaving with wire insertion, so that the filter device may also be used advantageously for hot gases.

The plate intended for the reception of the hoses to be suspended, may be suitably formed in the shape of a roof at the places between the openings to which the said hoses are to be connected, so as to avoid accumulation of dust, and particularly of dust of such nature that is liable to spontaneous combustion, for instance briquet dust. For the same reason, the lower end of each hose is preferably made of material having a greater permeability so that owing to the increased velocity of the air, an eventual accumulation of dust at the said place is avoided too.

In order to enable a cleaning of my improved filter by means of shaking movements or by beating the hoses whilst in operation, I have provided a cross-ring fixed to each hose at a determinate distance from its suspension point, and to each cross-ring there is attached a rod projecting upwardly beyond the hose opening and which is intended for imparting to each hose up and down motion causing thus the hose portion lying between the said cross-ring and the said suspension point, to be folded up like an accordion and to be drawn out again, the internal pressure above atmospheric resulting therefrom having the tendency to swell the hose so that the clear section of the hose in its folded-up position will not be reduced.

In order to have the free hanging hose ends held exactly spaced from one another and held at exact distance from the filter walls for the purpose of maintaining the air cross-section between them in an invariably uniform manner, they may be laterally sustained by a support having a position out of line with said up and down motion.

My invention will be more fully described hereinafter with reference to the accompanying drawings in which the same is illustrated as embodied in a convenient and practical form, and in which:—

Fig. 1 is a central vertical sectional view of the filter with its free hanging hoses in operative position;

Fig. 2 is a view similar to Figure 1, showing the device during the shaking motion for cleaning purposes;

Fig. 3 is an enlarged view of the suspension device, the hose being provided with a cross-ring for the transmission of shaking motion;

Figs. 4 and 5 are, respectively, a side elevation and a plan view of the plate provided with openings and intended for holding the hoses in suspended position; and Figs. 6 and 7 are, respectively, a side elevation and a plan view of the guiding device for the lower hose ends.

Reference being now had to the accompanying drawings by numerals, 1 designates the separate hoses each of which being by its upper end suspended upon a firmly arranged plate 3 having openings 4 for the attachment of each hose, the cross section of each opening corresponding to the cross-section of each hose, as shown in Figure 5. Fixed to the underside of each opening and extending in downward direction, is a ring-shaped collar piece 4' to which is attached the upper portion 2 of each hose 1. The spacing between each two openings 4 of the plate 3 is preferably provided with lateral faces 3' mounted in inclined position with respect to each opening and preventing any accumulation of dust between the said openings, as shown in Figures 4 and 5 respectively. The upper portion 2 of each hose consists preferably of softer and more permeable material than the remaining hose body, and to the lower extremity of said portion is fastened a cross-ring 5 carrying at its centre a rod 6 projecting upwardly, as shown in Figure 3. The separate rods 6 of each hose row are fixed to a common cross-bar 7 held in suspended position by a bar 8 which projects from the cover 9 of the filter casing 15 in upward direction. The up and down motion of the loosely seated bar 8 therefore causes the whole hose set to be intermittently raised and lowered so as to obtain a shaking movement necessary for cleaning the hoses by causing the dust to be detached therefrom.

Figures 1 and 2 show how the shaking device is mounted on the pipe 13. The lever 24 is swingingly journaled at 23. One arm of the lever engages between 8', 8'' of rod 8. Close to the other arm of the lever, a driving wheel 26 is rotatably journaled at 25. To produce the shaking motion, driving wheel 26 is rotated in the direction of the arrow. During the shaking process merely the portion of the hose disposed between the cross ring and the plate is contracted in accordion like fashion while the other portions of the hose consisting of stiff and heat resisting material remain practically unchanged in length while they are lifted and dropped. To prevent rubbing of the hoses against one another and against the walls of the casing, the bar 17 is attached to the lower portion of the hoses.

The lower extremity of each hose 1 is closed by a bottom 20 preferably made of filter cloth having a greater permeability than the remaining filter cloth, so that the gases to be purified may pass through the said bottom with increased velocity, thereby preventing any accumulation of dust upon the bottom of each hose.

In order to have the lower ends of the filter hoses held exactly spaced from one another and at determinate distance from the wall of the filter casing 15, a guide bar 17 has been provided, the said bar being held in suspended position by links 21 of elongated shape carried by the lower hose ends. The laterally bent ends of said bar are in loose contact with the narrow walls of the casing 15, whereas cross-rods 22 attached to said bar 17, are in loose contact with the broad sides of the filter wall.

The arrangement of the bar 17 and of the cross-rods 22 is made so that they form in a certain manner a guide-cross adapted to hold the hoses in their exact position, that is to say, at exact distance from one another without preventing either their up and down motion, or their getting longer or shorter.

Below the filter casing, there is secured a collecting chamber 16 having a pointed bottom and which is in connection with a pipe 19 for the removal of the eliminated dust, whereas the top of said chamber 16 is in communication with a pipe 18 for the admission of gases to be purified. Upon the cover 9 of the filter casing is mounted a connecting pipe 13 for the discharge of the purified gases, a hinged flap 12 being provided for shutting off the said pipe. Adjacent to this connecting pipe, there is upon the cover 9 arranged another connecting pipe 11 for the admission of rinsing air for cleaning the hoses, the said pipe being controlled by a hinged flap 10. Both hinged flaps 10 and 12 are alternately operated in such a manner that on the flap 10 being opened, the flap 12 is closed.

In operation:—The gases to be purified are, by means of a fan (not shown in the drawings) admitted through the pipe 18 and through the chamber 16 from below up between the hoses, and brought in contact with the outer walls thereof. The gases now pass through the said hose walls and through the openings in the plate 3, enter the collecting chamber 14 and pass from the latter through the opened flap 12 into the discharge channel 13, whereas the particles of dust are caused to adhere to the outer walls of the hose filters or to fall directly into the collecting chamber 16 from which they may be removed through the pipe 19.

When it is desired to have the filter hoses cleaned, the operation is as follows:—The flap 12 is closed and the flap 10 opened, and rinsing air is admitted through the pipe 11 by means of another fan (not shown in the drawings), the said rinsing air entering the device under higher pressure than the gases to be purified and admitted through the pipe 18. In consequence, the rinsing air passes through the hose walls from inside to outside, thereby swelling the said hoses, as shown in Figure 2, and sweeping away the particles of dust adhering to the outer walls of the hoses and causing the said detached particles of dust to fall into the collecting chamber 16 from which they may be removed. In order to facilitate removal of the particles of dust from the hose walls, the bar 8 will be simultaneously and in short intervals moved up and down thereby transmitting this shaking movement to the hoses and causing the upper portions 2 of said hoses to be folded up and to be drawn out again, without however reducing the clear cross-section, owing to the fact that the increased pressure of the rinsing air has the tendency to swell the said hose portions too.

It will be understood that I reserve the right to make all such changes in the form and arrangement of parts as will not depart from the spirit of the invention or the scope of the subjoined claims.

I claim:—

1. A hose filter of the character described, comprising in combination, a casing, a cover for closing said casing, hoses arranged in a row and in hanging position within said casing, the said hose being closed at bottom and open at top, means for holding the hoses in hanging position, said means being operable to shake the hoses for cleaning the latter, means for holding the hoses spaced from one another, a pipe for the admission of the gases to be purified, a chamber in said casing for collecting the purified gases after their passage through the device, a pipe in connection with said collecting chamber and intended for the discharge of the purified gases.

2. A hose filter of the character described, comprising in combination, a casing, a cover for closing said casing, hoses arranged in a row and in hanging position within said casing, the said hoses being closed at bottom and open at top and having their bottom and top portions made of material of greater permeability for facilitating passage of the gases to be purified, a firmly secured plate having openings for the reception of said hoses and for holding them in suspended position, ring-shaped collars fixed to the underface of said plate, each one of the said ring-shaped collars registering with one of said openings and being attached to the upper portion of each hose, a cross-ring provided between the upper end of each hose body and the lower end of each hose top portion, a series of bars, each bar being fixed to the centre of a cross-ring and projecting upwardly beyond the hose opening, a cross bar adapted for the reception of the series of said projecting bars, another vertical bar loosely seated in said cover of the casing and holding the said cross-bar with the hoses in suspended position, said vertical bar being operable for imparting shaking motion to the hanging hoses for the purpose of cleaning said hoses from particles of dust adhering thereto, a connecting pipe for the admission of rinsing air under increased pressure and controlled by a hinged flap, the said rinsing air stream being intended for sweeping away particles of dust adhering to the hose walls, a dust collector and a pipe for the removal of the collected duct.

3. A filter of the character described, comprising in combination a casing, a partition within said casing forming upper and lower chambers, said partition having a plurality of openings therein, a plurality of filter bags suspended from said partition and disposed within the lower chamber, each one of said bags being secured at an opening in said partition, a collar secured within the upper end of each bag adjacent to said partition, a vertical rod secured to each collar and passing through the corresponding opening in said partition, a cross member carrying each of said rods, and a vertically reciprocable supporting member connected to said cross rod, and means connected to said supporting member to impart a shaking motion to the filter bags for cleaning the latter of dust adhering thereto.

4. A filter of the character described comprising in combination a casing, a partition within said casing forming upper and lower chambers, said partition having a plurality of openings therein, a plurality of filter bags having their open ends in the openings of the partitions and suspended from said partition and disposed within the lower chamber, each one of said bags being secured at an opening in said partition, a collar secured within the upper end of each bag adjacent to said partition, a vertical rod secured to each collar and passing through the corresponding opening in said partition, a cross member carrying each of said rods, and a vertically reciprocable supporting member connected to said cross rod, and means connected to said supporting member to impart a shaking motion to the filter bags for cleaning the latter of dust adhering thereto.

In testimony whereof I affix my signature.

THEODOR HANSEN.